July 2, 1968  E. F. STEINERT ET AL  3,391,333
RESISTANCE NETWORK FOR ARC WELDERS
Filed Nov. 15, 1965  3 Sheets-Sheet 1

United States Patent Office 3,391,333
Patented July 2, 1968

3,391,333
RESISTANCE NETWORK FOR ARC WELDERS
Emil F. Steinert, Williamsville, and James E. Frederick, Clarence, N.Y., assignors to Westinghouse Electric Corporation, Pittsburgh, Pa., a corporation of Pennsylvania
Filed Nov. 15, 1965, Ser. No. 507,861
6 Claims. (Cl. 323—74)

ABSTRACT OF THE DISCLOSURE

A welding apparatus utilizing a plurality of parallelly connected resistors in the welding current circuit to control the current magnitude of the welding arc. Each resistor of the parallelly connected resistors comprises a variable portion and a fixed portion in which the fixed portion is of a low magnitude with respect to the magnitude of the variable portion at high resistance settings thereof and in which the fixed portion is of a magnitude to swamp out variations in magnitude between the variable resistance portions of the parallelly connected variable resistor portions when the variable portions are at low resistance settings. The variable portions may be tapered to provide a linear control of current and all are adjusted by the same driver.

---

This invention relates to arc welding and particularly to the arc welding of such sophisticated materials as Inconel alloy, Monel alloy, stainless steel, nickel, high-tensile-strength steels, and the like. In the welding of such materials, a highly stable steady arc, the parameters of which may be readily changed without extinguishing the arc, is required. It has been found that the arc welding of these sophisticated materials may be effected with a power supply which supplies a potential substantially higher than the arc potential and in which the excess of the supply potential over the arc potential is absorbed by substantially pure resistance. Application Ser. No. 330,062, filed Dec. 12, 1963, to Emil F. Steinert for "Arc Welding Apparatus," now U.S. Patent No. 3,296,413 dated Jan. 3, 1967, discloses such apparatus. The above-identified Steinert application is incorporated herein by reference.

The Steinert application discloses welding apparatus in which the resistance that absorbs the excess of the supply potential over the arc potential includes a plurality of resistors which are connected selectively in parallel between the work and the supply and change the resistance by discrete magnitudes. While the Steinert apparatus has operated highly satisfactorily, it does not readily lend itself to remote control of the welding current in situations in which it is necessary to change the resistance repeatedly during a welding operation.

It is accordingly an object of this invention to overcome the above-described disadvantage and to provide welding apparatus of the type in which the excess of the supply potential over the arc potential is absorbed by resistance which apparatus shall lend itself readily to remote control of the welding current and to precise control of this current.

Consideration has been given in arriving at this invention to the interposing of a continuously variable resistor or a plurality of continuously variable resistors in parallel between the supply and the work. But it has been discovered that for the range of currents over which the apparatus is to operate to weld effectively sophisticated materials variable resistors of such great dimensions as not to be practicable are required. Typically, the welding current is to vary from a low magnitude of the order of 5 amperes to a high magnitude of the order of 300 to 500 amperes. To achieve this range, for example, with continuously variable resistors of annular shape, it has been found that resistors several feet in diameter would be required. It is then an object of this invention to provide welding apparatus in which the excess of the supply voltage over the arc voltage is absorbed by pure resistance which shall include continuously variable resistors of reasonable dimensions.

In accordance with this invention, resistors which are continuously variable but whose resistance at progressive settings is tapered are interposed between the supply and the work. Each tapered variable resistor typically includes an array of resistance-wire turns and a wiper movable over the array and in contact with successive turns along the array as it moves. The turns taper or vary in resistance magnitude from one end of the array to the other end from turns of low resistance to turns of progressively higher resistance. Typically, the array of turns may be in the form of an annulus having the wiper mounted rotatable about the axis of the annulus. In the practice of this invention, a plurality of tapered variable resistors are connected in a parallel network to conduct the welding current with the wipers movable together over the array.

The wipers are motor operated and are in addition connected to an indicator from which the operator of the apparatus may read the magnitude of the welding current. In accordance with this invention in one of its aspects the tapering of the resistors is such that the welding current is a linear function of the angular position of the wipers so that the indications of welding current are uniformly spaced on the indicator and the variation in current which may be achieved by any incremental movement of the wipers is readily determinable by the operator.

It has been realized that if variable resistors of moderate cost are used in the practice of this invention, the resistance in series with the power supply and the work in the higher-current portion of the welding-current range may be substantially different for different resistors. The resistor of lowest resistance would then tend to hog the current and would be damaged or destroyed. This disadvantage is overcome in accordance with a further aspect of this invention by providing, in the network of parallel variable resistors, fixed resistance in series with each of the variable resistors. The fixed resistance is of low magnitude and determines the maximum welding current deliverable by the welding apparatus. The magnitude of the fixed resistance is such that the differences between the resistances of the variable resistors at high-welding current are negligible compared to the magnitude of the fixed resistance and the fixed resistance is negligible compared to the resistance of the variable resistors when the variable resistors are set at the lower-current settings.

The above-described combination of fixed and variable resistance also results in highly economical apparatus and in addition provides a finer and more linear current adjustment than prior art apparatus at the higher end of the current range.

For a better understanding of this invention, both as to its organization and as to its method of operation, together with additional objects and advantages thereof, reference is made to the following description taken in connection with the accompanying drawings, in which.

Figure 1:
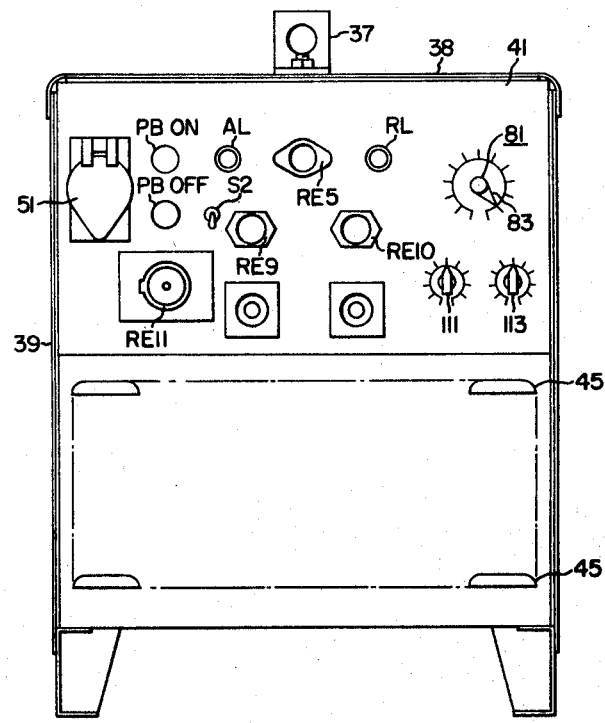
FIGURE 1 is a view in perspective of apparatus in accordance with this invention in its cabinet as it is used.

The apparatus shown in the drawings includes a supporting base 11 in the form of a sheet metal member of channel cross section to whose supporting surface a plurality of vertical frames 13 and 15 are secured. One frame 13 is formed of a plurality of vertical angles 17 interconnected by cross plates 19, 21 and 23 and diagonal frames 25 and 27. The other frame 15 is formed of vertical channels 31 across which a generally box-like cover 33 extends. Bolts 35 are provided in the top of the cover 33. An eye assembly 37 for raising or lowering the apparatus is secured to these bolts. The angle frame 13 supports the variable resistors P1 of this apparatus and the channel frame 15 supports the rectifier 4RX, transformer 1T and other components of this apparatus.

The apparatus is enclosed in a container formed of a sheet metal top 38 and sheet metal side walls 39. The upper part of the front of the container has a front panel 41 formed of a sheet metal plate bent at right angles on three sides. The push buttons, terminals, receptacles, indicators and other related parts of the apparatus extend through the plate. The components directly behind the front panel 41 are enclosed in a dust-tight box 43. The lower part of the front of the apparatus is a sheet-metal louvered plate 45 bent at right angles at opposite sides. The top 38 and side walls 39 of the container are bolted to the angles 17 and to the edges extending from the front panel 41 and the louvered plate 45. The rear (not shown) of the container is of open work construction permitting the flow of air through the components.

Electrically, the apparatus includes a power supply unit and a control unit. This apparatus is energized from the buses L1, L2, L3 of a commercial three-phase sixty-cycle supply through the contacts Ma, Mb, Mc of a contactor M.

The power supply unit includes a transformer 1T having an open-delta primary 1TP and an open-delta secondary 1TS. Direct current is derived from the secondary 1TS through a diode bridge 4RX preferably of the silicon or germanium type. The direct-current output of the rectifier 4RX is impressed through a network NR substantially of pure resistance between the work W to be welded and the welding electrode E. In the typical practice of this invention the electrode E is a non-consumable electrode of the tungsten type.

Figure 2:
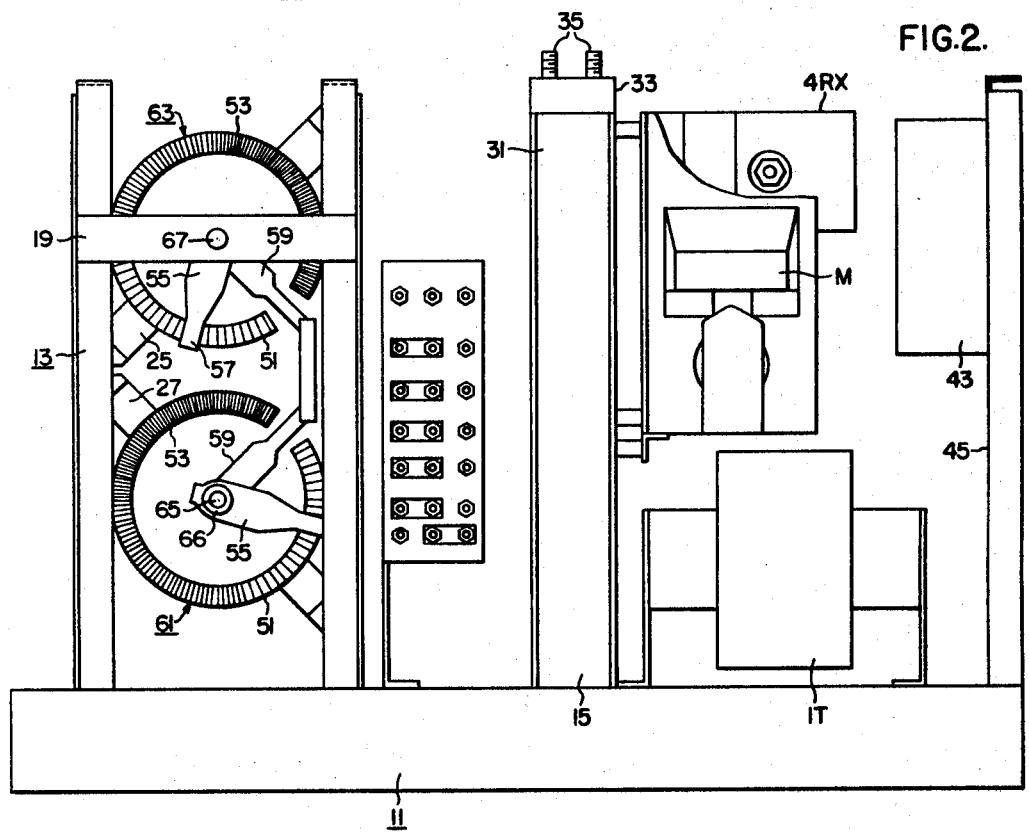
FIG. 2 is a view in perspective of the apparatus shown in FIGURE 1, with the side and top walls of the cabinet removed and with the front panel on the right.
Figure 3:
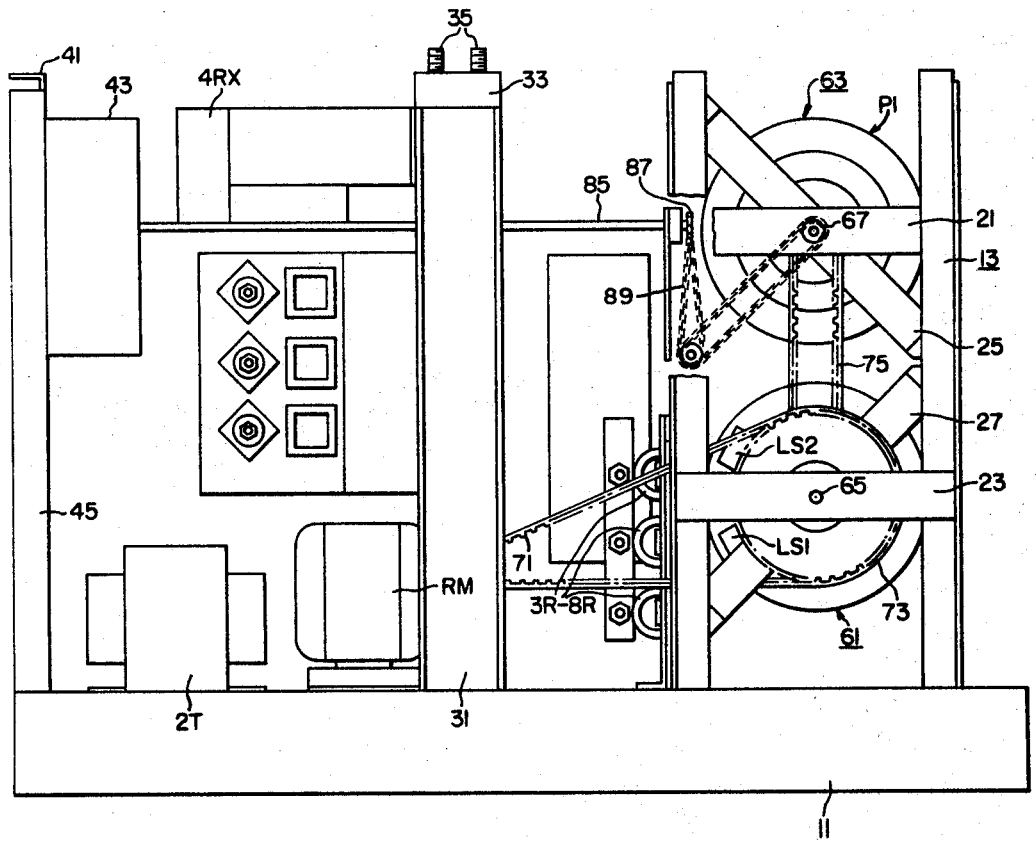
FIG. 3 is a view in perspective similar to FIG. 2 but with the front panel on the left.

The network NR includes a bank P1 of variable resistors of the tapered type to each of which a fixed resistor 3R, 4R, 5R, 7R and 8R is connected. The variable resistors P1 and their associated fixed resistors 3R through 8R are connected in parallel in the network NR. The resistors 3R, 4R, 5R, 7R and 8R are center-tapped and in each case the resistance in series with a variable resistor P1 is the resistance between one end of one of the resistors 3R through 8R and the tap. Each of the variable resistors is of the annular type and is formed of a plurality of turns arranged in an annulus (FIG. 2). The turns are of progressively varying resistance from one terminal of the annulus to the other remote terminal. At or near the low resistance end the turns are relatively wide ribbons 51; at the higher resistance end, the turns are composed of relatively thin conductors 53 closely spaced. Each resistor has a movable arm 55 having a wiper 57 at its end which engages the turns 51 and 53. Each resistor also includes a fixed arm 58 connected at one end to the lowest resistance terminal of the annulus but insulated from the movable arm 55. The resistors P1 are mounted ganged in vertically displaced banks 61 and 63 in the angle frame 13. Each bank 61 and 63 has a common shaft 65 and 67 which is rotatable in bearings (not shown) in the diagonal frames 25 and 27. The movable arms 55 are mounted rotatably by the shafts 65 and 67 but insulated from the shafts and an insulating hollow shell 66 coaxial with the shaft 65. The shaft 65 and the arm 55 connected to it are driven through a motor RM mounted on the base plate 11 of the apparatus (FIG. 3) through a cog belt 71 which engages a cog wheel 73 in driving relationship. The shaft 67 and the arm 55 connected to it are driven through another cog belt 75 connected between cog wheels (not shown) on shafts 65 and 67.

For the purpose of aiding the operator in assuring that the variable resistors P1 are set to conduct the desired welding current, a current indicator 81 including a scale and a pointer 83 is provided on the front panel 41 of the apparatus. Because the resistors P1 are properly tapered, this scale 81 may bear uniformly spaced current indications since the current is a substantially linear function of the setting of the wipers 57. The pointer 83 of the scale is connected to indicate the angular positions of the wipers 57 through a rod 85, gearing 87 and a chain 89 to the shaft 67 of the upper bank 63 of resistors P1 and its position directly corresponds to the position of the wipers 57.

Since the resistors P1 are of moderate cost, the resistance derivable between the wiper 57 and the fixed arm 59 for each of the resistors is not precisely equal to the corresponding resistance for the other resistors. At the low resistance terminal of the resistors P1 this difference constitutes a substantial proportion of the actual resistance of each of the resistors. Because of this difference, the lowest-resistance variable resistor would tend to hog the current conducted through it and become damaged. To suppress this damage, the fixed resistors 3R through 8R are included in the apparatus. These fixed resistors 3R through 8R are of the usual edge-wound type and are mounted on brackets adjacent the angle frame. The resistance of the fixed resistors 3R through 8R is such that it swamps any variations between the resistances of the variable resistors P1 at low resistance but is negligible compared to the resistance of the variable resistances in the higher resistance settings of the wipers 57. Typically, each variable resistor P1 may introduce a resistance of between 0 and 70 ohms over the whole range of welding current supplied by the apparatus and each of the fixed resistors 3R through 8R may have a resistance of .97 ohm so that the total fixed resistances in the parallel network is of the order of .1 ohm. The voltage drops across the transformer 1T and rectifier 4RX, resistors P1 and 3R through 8R and arc in the operation of typical apparatus in accordance with this invention over the range between 300 and 5 amperes as shown in Table I below.

TABLE I

| Welding Current Amperes | Drop Volts Transformer and Rectifier | Drop Volts Resistors P1-3R-8R | Drop Volts Arc | Open Circuit Supply, Volts | Resistance Resistors P1-3R-8R, Ohms | |
|---|---|---|---|---|---|---|
| | | | | | 3R-8R | P1 |
| 300 | 9 | 34 | 37 | 75 | .113 | 0 |
| 200 | 6 | 41 | 28 | 75 | .113 | .092 |
| 100 | 3 | 48 | 24 | 75 | .113 | .365 |
| 5 | (¹) | 55 | 20 | 75 | .113 | 10.997 |

¹ Negligible.

The wide range of resistance between .113 ohm and about 11 ohms is of interest as it demonstrates why the tapered resistance P1 is necessary.

In the practice of this invention with a non-consumable electrode E, a high-frequency stabilization current potential is usually impressed in the welding circuit between the electrode E and the work W. This potential is impressed to start the arc and is turned off after the arc starts. To suppress the flow of high-frequency current through the diode bridge 4RX, capacitors 1C and 2C are connected across the output terminals of the bridge 4RX and the junction between these capacitors is grounded. In addition, peak voltage which might damage the diodes of bridge 4RX is suppressed by a network including a low resistor 1R and a capacitor 3C connected in series between the output conductors of the bridge 4RX. The capacitor 3C is shunted by a resistor 2R. Rebuffoni et al., Patent 3,125,703, assigned to Westinghouse Electric Corporation, is directed to this peak voltage suppression circuit, and its operation is disclosed in this Rebuffoni patent.

The control unit is supplied from a transformer 2T which is energized independently of the contactor M through the switch S1 from the buses L2 and L3. This transformer 2T has a primary 2TP and secondaries 2TS1 and 2TS2. Secondary 2TS1 is center-tapped. Typically, this secondary can deliver 115 volts between the center tap and each of its terminal taps so that either 230 volts or 115 volts may be derived from 2TS1. The 230 volt is derivable for external use through a receptacle RE5 and the 115 volt is derivable through a receptacle RE10. Both receptacles RE5 and RE10 are on the front panel 41 of the apparatus. Typically, 2TS2 is a low-voltage winding capable of delivering about 24 volts for operating certain of the relays.

The control unit includes push button PBON for turning the apparatus on and push button PBOFF for turning the apparatus off.

Figure 4:
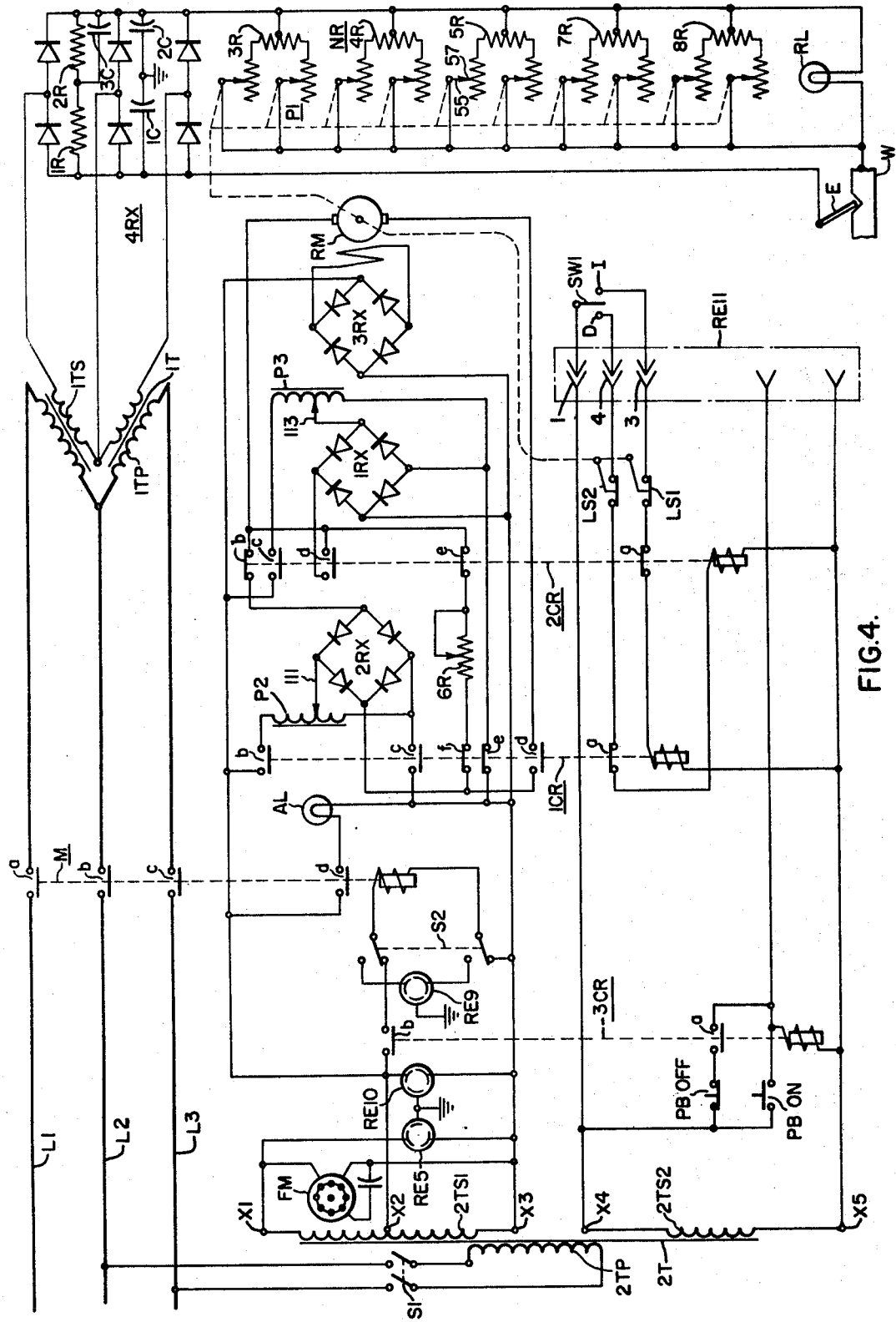
FIG. 4 is a schematic of the apparatus shown in FIGURE 1.

Push button PBON is normally open and may be momentarily closed to energize the coil of a relay 3CR from the secondary 2TS2 (FIG. 4). The relay 3CR is locked in through its contact 3CRa and push button PBOFF which is normally closed. To turn the apparatus off PBOFF is momentarily opened.

The control unit also includes the contactor M which may be connected for local control at the apparatus and from its front panel or for remote control by operation of a switch S2. In FIG. 4 the switch S2 is set for local operation and in this position of the switch, the contactor M is adapted to be connected between the terminal X2 and the terminal X3 of secondary 2TS1 through the switch, a thermal protective element such as a Thermoguard element, and a front contact 3CRb of the relay 3CR. On the actuation of push button PBON contactor M is actuated.

In the remote setting of the switch S2 contactor M is connected to be actuated through a receptacle RE9 which is on the front panel 41 of the apparatus and which, for the purpose of remote operation, is connected to a remote panel (not shown).

The motor RM which sets the resistors P1 is controlled from relays 1CR and 2CR. Relay 1CR is actuated to decrease the resistance of the variable resistors P1 and increase the current and 2CR is actuated to increase the variable resistance and decrease the current. Relay 1CR is connected in a circuit from terminal 3 of the remote receptacle RE11 through limit switch LS1 which opens when the motor drives the resistors to the upper-current limit, interlock back-contact 2CRa, the coil of 1CR, to the lower terminal X5 of the secondary 2TS2. The coil of relay 2CR is connected in a similar circuit extending from terminal 4 of RE11, limit switch LS2 which opens when the variable resistors P1 reach the lower current or limit, interlock back-contact 1CRa, the coil of relay 2CR to the terminal X5. The operation of the relay 1CR is controlled by a switch SW1 which may be connected to a plug-in connector for local operation or may be connected to the remote plug-in connector for remote operation. The switch SW1 may also be provided as a toggle switch on the front panel 41 of the apparatus, but the apparatus shown in FIGURE 1 includes no such switch. In either eventuality, the terminal I of the switch SW1 is connected to terminal 3 of receptacle RE11, the terminal D on the switch SW1 is connected to terminal 4 of RE11 and the movable arm of the switch SW1 is connected to terminal 1 which is the same as terminal X4 of the secondary 2TS2. Closing of switch SW1 to position I causes relay 1CR to be actuated; closing of switch SW1 to terminal D causes relay 2CR to be actuated.

The motor RM is energized from variable transformers P2 and P3 through rectifiers 2RX and 1RX, respectively. With the motor RM energized from P2 the wipers 57 of the variable resistors P1 are moved in such a direction as to decrease the resistance and raise the welding current and with the motor energized from variable transformer P3 the wipers are moved in a direction such as to decrease the welding current. The variable transformers P3 and P2 may be set from the front panel by knobs 111 and 113 to increase or decrease the rate or speed at which the resistance P1 change in the respective directions.

Variable transformer P2 is energized from terminals X2 and X3 of secondary 2TS1 through contacts 1CRb and 1CRc of relay 1CR when relay 1CR is energized. Rectifier 2RX is supplied from the portion of the transformer P2 between its adjustable arm and its lower terminal. The direct-current derivable from the rectifier 2RX is supplied to the armature of the motor RM through contact 1CRd which is closed when relay 1CR is actuated and through contact 2CRb, an interlock back-in contact.

Variable transformer P3 is energized from terminals X2 and X3 through contacts 2CRc and 1CRe when relay 2CR is actuated. The rectifier 1RX is supplied between the adjustable arm of the variable transformer P3 and its lower terminal. The direct-current output of rectifier 1RX is impressed across the armature of the motor RM through the contact 2CRd of relay 2CR. Braking resistor 6R is connected across the armature of motor RM through contacts 2CRe and 1CRf. Both contacts are back contacts and the braking circuit is open when either relay 1CR or 2CR is actuated. When relay 1CR or 2CR is deenergized, the braking circuit is immediately closed instantaneously stopping the motor RM.

The motor RM has a field which is supplied with potential from the terminals X2 and X3 through rectifier 3RX.

A cooling motor FM is provided which is energized from the terminals X1 and X3 of the secondary 2TS1, this motor cooling air to flow through the louvers 45 over the transformer 1T and rectifier 4RX, over the variable resistors P1 and out through the rear of the cabinet.

In the use of the apparatus the work W is set in position to be welded and the electrode E is arranged in welding relationship with the work. The operator then closes the power switch S1 so that power is supplied to the transformer 2T.

For local welding the switch S2 is in the position shown in the drawings, and for remote welding it is moved to the remote position indicated. It will be assumed in describing the operation that the switch is in the position shown and that the work W is being welded near the apparatus shown in FIGURE 1. In this case, the switch SW1 is set in the position I or the position D to increase or decrease the initial welding current from a setting and the associated variable transformer P2 or P3 is set to an initial welding position. The proper setting may be determined from past experience with the work welded. The scale 81 indicates the welding current at any setting and the knobs 111 and 113 may serve to increase or decrease the speed at which the welding-current setting is changed.

With welding-current setting as desired switch SW1 is opened, the electrode E is held in welding position with respect to the work W and the switch PBON is closed actuating relay 3CR which is locked in through PBOFF and 3CRa. Contactor M is actuated energizing the power supply by the closing of contacts Ma, Mb and Mc. An indicator AL is also energized through Md. An arc is now fired between the electrode E and the work W. If the electrode is of the non-consumable type, a stabilizing high-frequency potential may be impressed between the electrode E and the work W from a stabilizer (not shown). Once the arc is fired, the welding proceeds. During the welding, the operator may precisely adjust the welding current so that the welding operation is smooth by closing SWI to the welding-current increasing position I or welding-current decreasing position D and properly setting the variable resistors P1. If the current should be increased or decreased rapidly, the variable transformers P2 and P3 may be set to increase the speed at which the variable resistance is changed.

At the end of the welding operation, button PBOFF is opened deenergizing relay 3CR and contactor M and interrupting the supply of welding current. During the welding operation the lamp RL is energized by the voltage across the variable resistors P1 and the fixed resistors 3R through 8R.

The following description may aid in the understanding of this invention:

Steinert application 330,062 discloses a resistor-controlled arc welder typically of the DC type. This apparatus includes fixed resistors in the circuit conducting the welding current with switches or breakers to adjust the total resistance in the circuit for a wide range of welding current.

Welders of this type adequately serve most industrial requirements. Some welding applications require precise remote control of the welding current, increase and decrease of the current while welding and programming of the current control for repetitive cyclic operations.

This current control requirement has been accomplished in accordance with this invention with motor-driven variable resistors P1 in the arc circuit to vary the resistance over the full wide range of current adjustment. A fixed resistance 3R through 8R is connected in series with each variable resistor and limits the welding current to the maximum setting value when the resistors P1 are turned to minimum resistance. The resistors P1 have tapered windings to give an approximate linear relationship between angle of rotation and welding-current setting.

Resistors P1 can be provided which are of reasonable dimensions and give a wide range of current settings of, for example, 300 to 500 amperes down to minimum current of about 5 amperes. An outstanding feature of this apparatus is that it has electrical characteristics best suited to the welding arcs of most arc-welding processes.

A current indicator is driven from the wiper shaft of the variable resistors P1 and calibrated in amperes. A programming control can also be driven from the resistor shaft.

The physical arrangement of the components in the container of the apparatus is such that the fan driven by motor FM draws cool air in through the louvers 45 in the front of the welder, through the rectifier 4RX, transformer 1T, the fan, resistors 3R through 8R, and variable resistors P1, and is exhausted out the rear of the container. In this manner the other components are not exposed to the heat from the resistors 3R through 8R and P1.

For tungsten inert gas welding high frequency is generally required for arc ignition. A complete unit may be provided according to this invention incorporating the high frequency in addition to gas and water control with automatic sequencing.

The resistor motor RM is electrically reversible with dynamic braking. The speed of this drive, which is directly related to the speed of current adjustment, is adjustable by means of variable auto-transformers P2 and P3. Separate speed adjustment is provided for raising and lowering. A 24 volt pilot control circuit is provided for remote station control.

While a preferred embodiment of this invention has been disclosed herein, many modifications thereof are feasible. This invention, then, is not to be restricted except insofar as is necessitated by the spirit of the prior art.

We claim as our invention:

1. Arc-welding apparatus for arc-welding work including power supply conductors for producing an arc-welding potential at said work substantially greater than the potential drop across the welding arc, a plurality of variable resistors, each of said resistors including an array of resistance-wire turns and a wiper in contact with said turns movable over said array, said turns tapering in resistance magnitude from one end of said array to the other end, from turns of low resistance through turns of progressively higher resistance, means connecting said resistors in a parallel network, means connecting said wipers to move together between the low resistance and high resistance turns of the associated variable resistors, and means connected to said network for connecting said network in voltage-absorbing relationship between said conductors and work, said variable resistors being of such magnitude that the welding current is continuously variable over substantially its whole range by variation of said variable resistors.

2. The apparatus of claim 1 including fixed resistance means is connected in series with each variable resistor in the parallel network, said fixed resistance means being of such magnitude as to render negligible differences in resistance between different variable resistors when the wipers of said resistors are at the lower-resistance end of the arrays and said fixed resistance means determines the maximum welding current deliverable by said apparatus, said fixed resistance means being negligible compared to the resistance of said variable resistors when the wipers of said variable resistors are set at the higher-resistance settings of said array.

3. The apparatus of claim 2 wherein the power-supply conductors include a first conductor and a second conductor, and wherein each fixed resistance means includes a terminal connected to a terminal of the associated variable resistor and an opposite terminal, said first conductor being connected in common to the wipers of the variable resistors and said second conductor being connected in common to said opposite terminals.

4. The apparatus of claim 1 wherein the tapering of the resistors is so related to the setting of the wipers that the welding current supplied is a linear function of the position of said wipers.

5. Arc-welding apparatus for arc-welding work from power-supply conductors, said supply conductors supplying an arc-welding potential at said work substantially greater than the potential drop across the welding arc, variable-resistance means including resistance elements and wiper means movable in contact with said elements to set the effective resistance of said resistance means, the resistance of said elements varying progressively from a lower resistance to a higher resistance, and said wiper means being movable in contact with said elements between the elements of higher resistance and the elements of lower resistance to vary said effective resistance progressively over the range between said higher and lower resistance, and means connected to said resistor means for connecting said effective resistance between said supply conductor and work to conduct the welding current therebetween, and to absorb the variable excess of said arc-welding potential over said potential drop over the whole range of welding current, the progressive variation of said resistance elements being such that the welding current conducted by said effective resistance at settings of said wiper means is a substantially linear function of the position of said wiper over the whole range of welding current.

6. The apparatus of claim 1 wherein the resistance of the variable resistors varies continuously from a resistance of less than .1 ohm to a resistance in excess of 10 ohms.

References Cited

UNITED STATES PATENTS

| 1,329,233 | 1/1920 | Eschholz | 315—126 |
| 2,976,395 | 3/1961 | Spencer | 219—108 |

JOHN F. COUCH, *Primary Examiner.*

W. E. RAY, *Examiner.*